US012110709B2

(12) United States Patent
Smith

(10) Patent No.: US 12,110,709 B2
(45) Date of Patent: Oct. 8, 2024

(54) LIFT AND STORAGE SYSTEM

(71) Applicant: PowerLine Lift, LLC, Indianapolis, IN (US)

(72) Inventor: Greg Smith, Indianapolis, IN (US)

(73) Assignee: PowerLine Lift, LLC, Indianapolis, IN (US)

( * ) Notice: Subject to any disclaimer, the term of this patent is extended or adjusted under 35 U.S.C. 154(b) by 373 days.

(21) Appl. No.: 17/570,646

(22) Filed: Jan. 7, 2022

(65) Prior Publication Data

US 2022/0213711 A1 Jul. 7, 2022

Related U.S. Application Data

(60) Provisional application No. 63/134,692, filed on Jan. 7, 2021.

(51) Int. Cl.
*B66F 7/00* (2006.01)
*B66F 7/06* (2006.01)
(Continued)

(52) U.S. Cl.
CPC ............. *E04H 6/42* (2013.01); *B66F 7/0616* (2013.01); *B66F 7/08* (2013.01); *B66F 7/28* (2013.01)

(58) Field of Classification Search
CPC .. E04H 6/06; B66F 7/0616; B66F 7/08; B66F 7/28; B66F 7/02
See application file for complete search history.

(56) References Cited

U.S. PATENT DOCUMENTS 2,238,573 A * 4/1942 Steedman ................. B66F 7/02 187/209
2,843,222 A * 7/1958 Villars .................... B66F 7/025 187/210
(Continued)

FOREIGN PATENT DOCUMENTS

CN 203959091 U 11/2014
CN 105569391 A * 5/2016
(Continued)

OTHER PUBLICATIONS https://www.spaceliftproducts.com/shop/.
(Continued)

*Primary Examiner* — Emmanuel M Marcelo
(74) *Attorney, Agent, or Firm* — Krieg De Vault LLP; Daniel Tychonievich

(57) ABSTRACT

A movable platform storage device for off-floor storage including a substantially vertical support member (column) anchored to a concrete floor that defines the deployment axis. The movable platform is connected to the vertical support member (column) and can be raised or lowered to one of any plurality of positions oriented generally transversely to the deployment axis by means of an electric servo-motor power unit and wire cable lifting system. The column is available in different lengths to accommodate ceiling height limitations and desired raised platform heights. The platform storage device can be used as a single stand-alone unit or multiple storage units can be combined in a configuration that creates a unique electric/mechanical powered elevated mezzanine system with increase elevated storage area. The servo motor electric/mechanical wireless power system on each of the combined storage lifts can be programmed identically so that all platforms will raise and
(Continued)

lower simultaneously. The strength of the unique angled column design and wrap around moveable carriage equipped with a back-brace system (that may be modified) allows the invention to support and lift a variety of adjustable platform configurations that may be needed for various storage applications. Most customers will want to install the storage lift column as close to a wall as possible to maximize the garage floor storage space under the raised platform. The standard adjustable platform is either a square or rectangular configuration. This platform configuration would not allow the column to be placed tightly into a corner and valuable under platform garage floor storage area would be lost. The issue is resolved with a "corner" designed platform that allows the column to be installed very close to the interior corner of the garage. This uniquely designed platform can be manufactured in various sizes. Alternative adjustable platform configurations can also be used. These various platform configurations can be installed on the invention because of the unique wrap around carriage's ability to support alternative back brace systems and under platform support systems to which various platform sizes and configurations may be attached. These (almost infinite) adjustable platform configurations allow the column to be installed and operated so that a minimum amount of available garage floor storage space is compromised.

17 Claims, 20 Drawing Sheets

(51) Int. Cl.

| | |
|---|---|
| ***B66F 7/08*** | (2006.01) |
| ***B66F 7/28*** | (2006.01) |
| ***E04H 6/42*** | (2006.01) |

(56) References Cited

U.S. PATENT DOCUMENTS

| | | | | |
|---|---|---|---|---|
| 5,911,408 | A * | 6/1999 | Berends | B66F 7/04 280/43.23 |
| 6,409,153 | B1 | 6/2002 | Norris | |
| 7,168,904 | B1 | 1/2007 | Perkins et al. | |
| 7,771,155 | B2 | 8/2010 | Thiel | |
| 8,414,243 | B2 | 4/2013 | Stokes | |
| 9,249,000 | B2 | 2/2016 | Finkbeiner | |
| 2009/0016863 | A1* | 1/2009 | Rauch | B66F 7/02 414/239 |
| 2009/0196721 | A1* | 8/2009 | Thiel | B62H 3/12 414/427 |
| 2010/0059466 | A1* | 3/2010 | Tanner | A47B 51/00 70/174 |
| 2014/0305742 | A1 | 10/2014 | Graf | |
| 2019/0241414 | A1 | 8/2019 | Willard | |
| 2020/0407997 | A1* | 12/2020 | Chiu | E04H 6/188 |

FOREIGN PATENT DOCUMENTS

| | | | | | |
|---|---|---|---|---|---|
| CN | 108386030 | A | * | 8/2018 | E04H 6/06 |
| CN | 108657987 | A | * | 10/2018 | B66F 7/02 |
| CN | 109424226 | A | * | 3/2019 | |
| CN | 109629871 | A | * | 4/2019 | E04H 6/06 |
| CN | 110656794 | A | * | 1/2020 | E04H 6/005 |
| CN | 112062046 | A | * | 12/2020 | |
| CN | 112174014 | A | * | 1/2021 | |
| DE | 3430948 | A | * | 3/1986 | B66F 7/02 |

OTHER PUBLICATIONS https://versaliftsystems.com/pages/pricing.
https://www.retirementliving.com/home-elevators.
https://www.spaceliftproducts.com/ladder-safety/.
https://aladdinstoragelift.com/shop/.
https://theatticlift.com.
https://garageevolution.net.

* cited by examiner

LIFT AND STORAGE SYSTEM

This application claims priority to U.S. provisional Patent Application Ser. No. 63/134,692 filed on Jan. 7, 2021, the complete disclosure of which is incorporated herein by reference.

BACKGROUND OF THE INVENTION

The subject invention pertains to a lift and storage system, and in particular, to a lift and storage system that in one embodiment, includes a single post having a diamond shaped cross-section that can be mounted next to the front wall or in a corner of a garage or other building wherein items can be stored on a platform of the lift and raised above a vehicle or other items in the garage/building for storage there above.

Homeowners want to reclaim their garage floor space for what it was intended . . . the parking of cars in a sheltered building. Many homeowners have seen their garages become a storage location for items other than their vehicles. They are forced to park their vehicles outside and exposed to the weather. The single post storage lift is designed to raise the “offending” stored items into the air so that the cars may be driven under the platform (if the storage unit is mounted on a side wall) . . . or stored over the front hood (if the storage unit is mounted on the front wall of the garage).

The unique design allows the storage lift to provide a very large storage area while occupying a very small area of valuable floor surface space.

The invention addresses the need for an onsite storage system in a home garage or business warehouse where available floor storage space is limited. In one embodiment, the invention creates an elevated 1750-pound capacity, 8-ft× 8-ft storage area that occupies about a 12-inch×12-inch area of valuable floor space. Homeowners and businesses recognize the need for additional onsite storage space. Homeowners and businesses have plenty of cubic space (overhead air space in their garage or warehouse) that is unused and available for additional storage. The invention’s features include an adjustable platform storage area and the electrical/mechanical means to safely lift, lower and support the storage platform parallel to the floor. The invention can be located either indoor or outdoor provided that the support column base is properly fastened to a concrete floor with a minimum depth of four (4) inches. The invention may be installed in multiples to increase the overall raised platform storage area.

Home garages and business warehouse ceiling heights are normally a minimum of 8 feet (96 inches) high and most garage ceilings are higher. The invention recognizes ceiling height limitations and offers the choice of different length (height) columns to allow the customer the choice of the maximum bottom height of the raised platform. All column lengths are interchangeable with the standard adjustable platform and/or support system and other platform configurations. The power needed is 110/120 volt electric. The increased height of a column allows for the increased raised height of the stored platform.

The invention may be installed in a plurality of locations because it is self-supporting (anchored to concrete) and does not require additional column support that is sometimes required by other garage storage systems, such as, a wall support or overhead ceiling beam support.

The invention improves upon prior single post electric/hydraulic platform storage systems. Prior art lift systems contained several features that limited their popularity with customers. These issues were addressed and resolved in this model.

Previous lifts are very heavy and cumbersome and difficult to install. It was realized that for a home garage storage lift to be popular, it needed to be relatively lightweight and not difficult to install. The column size and configuration were changed on the inventive lift to reduce the column weight but still provide the needed vertical strength to support a raised platform. In one embodiment, the subject invention includes an enclosed capped square column installed so that a corner angle was positioned toward the middle of the platform resulting in a far superior back brace stress reduction design compared to lifts whose columns have either the front or back of the square or rectangular column facing the middle of the platform. The addition of the unique wrap around carriage added extra support stability to the raised platform and allowed the overall weight of the lift to be substantially reduced from previous models.

Other single post lifting systems require the use of hydraulic cylinder(s) powered by an electric/hydraulic power unit that is remotely located or attached to the vertical column. It was realized that such an electric/hydraulic power system was not user-friendly for the average Homeowner.

Disadvantages of the electric/hydraulic system include: 1) Hydraulic fluid may leak from the system causing erratic operation of the lift and produce puddles of leaked fluid on the floor; 2) Installation and adjustment of an electric/hydraulic system have proven difficult for the average homeowner; and 3) an electric/hydraulic power system does not always produce a “smooth” operation of lifting and lowering. Hydraulic fluid’s viscosity is affected by temperature and freezing inside/outside temperatures may prevent the smooth operation of an electric/hydraulic power system.

On the other hand, homeowners are very familiar and comfortable with the wireless remote operation of an overhead electric garage door. It is believed that a wireless electric motor/cable drum system mimicking the operation of an electric overhead door system is much more acceptable for the average homeowner than the electric/hydraulic power system used on the previous single post storage lift system.

Features of the present invention, in one embodiment, include the desirable features of a single post on-site garage storage system including: 1) being relatively lightweight in total weight, and each of the component pieces being easy to handle/move/position by a minimum of two able bodied persons; 2) installation can be performed by persons that are mechanically inclined and familiar with the operation of needed power tools; 3) operation of the storage lift is easy for the average person to understand and execute, so that an operator can feel confident with the raising and lowering of the platform; 4) packaging of the lift such that the entire packaged lift may be transported in an average sized pick-up truck or similar, and wherein the lift can also be packaged (perhaps more than one crate size is needed) so that it can be delivered and offloaded by an LTL carrier at a customer’s location; and 5) the lift must be able to be installed in a variety of inside garage space locations and considering garage ceiling heights, a variety of platform configurations for different locations can be provided. Maximum platform lifting heights are also a factor for consideration.

Prior art onsite garage storage systems require a modification of ceiling or attic space. These overhead systems do not provide the same lifting capacity, nor the larger square foot storage area as does the invention. Also, many garages do not have available attic storage areas, and most attic storage systems require a separate drop-down stair system which allows the owner to access the attic. These drop-down stairs may be unstable and are certainly inconvenient to use.

Other prior art garage storage systems have storage platforms attached to the ceiling and require the use of a separate ladder to access the stored items or to carry the items up to be stored. The climbing or descending of any ladder system can be dangerous even if both hands are available for support. If the person climbing or descending the ladder is carrying an item, and both hands are not available for support, then the risk for injury is greatly increased.

Other prior art above floor platform storage systems require wall support modifications for proper installation. Many garage owners are unable or unwilling to make these required wall modifications.

On the other hand, in one embodiment, the invention's column and carriage and platform are made from steel. However, because of the unique design of the vertical column and wrap around carriage, these components (as well as the platform frame) can be manufactured from aluminum or other types of metal or a variety of synthetic materials.

In one embodiment, the adjustable platform has an underneath slat support system made from steel, but these slats can be made from a variety of materials. The floor covering for platform can be a made from a variety of materials. The customer will can select the flooring that is placed inside the frame rails and rests on the steel slats.

This flooring can be (but not limited to) any type of solid wood/metal or metal mesh type flooring that can adequately support the maximum rated capacity for this lift. Examples of preferred flooring material would be 0.375 (38 inch) plywood or steel wire mesh sections that can be positioned and adequately supported by the under-platform steel slat system. In a preferred embodiment, the maximum safe (net) lifting capacity of the lift is 1750 lbs. (evenly distributed on the platform surface). The weight of any addition to the standard platform floor needs to be counted toward the 1750 lb. lifting capacity of the storage lift.

The platform system may also consist of moveable arms attached to the back brace. The back brace may be made in a variety of widths.

In one embodiment, arms extend outward from the back brake and act as a support system to which any type of platform (portable or fixed) can be attached. (or placed on top) The arms can be adjusted to different angles and lengths to support the platform. Size, configuration and weight capacity of the platform may vary but cannot exceed the safe lifting capabilities of the storage lift

SUMMARY OF THE INVENTION

The present invention relates to a storage system that provides an onsite off-floor adjustable storage area on a platform that can be raised/lowered to a variety of secure heights. The raised platform allows for under the platform vehicle parking and/or provides additional floor space storage underneath the platform. The device includes a vertical column with an adjustable sized platform movably connected to the vertical column. The platform actuator (electric servo-motor and cable/drum lift pulley system) is operationally connected to the platform and may be energized to move the platform into any of a plurality of parallel vertical positions oriented generally transversely to the deployment axis. The platform is securely supported in its raised position. The raised platform can be additionally supported by means of "drop down" support legs attached to the front of the platform. The invention allows for a variety of column heights that can be used with a variety of platform configurations. The combination of the correct column height (length) and appropriate platform configuration allows this lift to be configured and installed in garages or storage buildings with different ceiling heights and placement requirements.

The invention is designed so that multiple storage lifts may be installed next to each other so as to create a much larger SINGLE platform storage area. The concept of multiple lifts positioned next to each other can be best described as an on-site electric powered mezzanine storage system that can be raised or lowered as a single unit.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
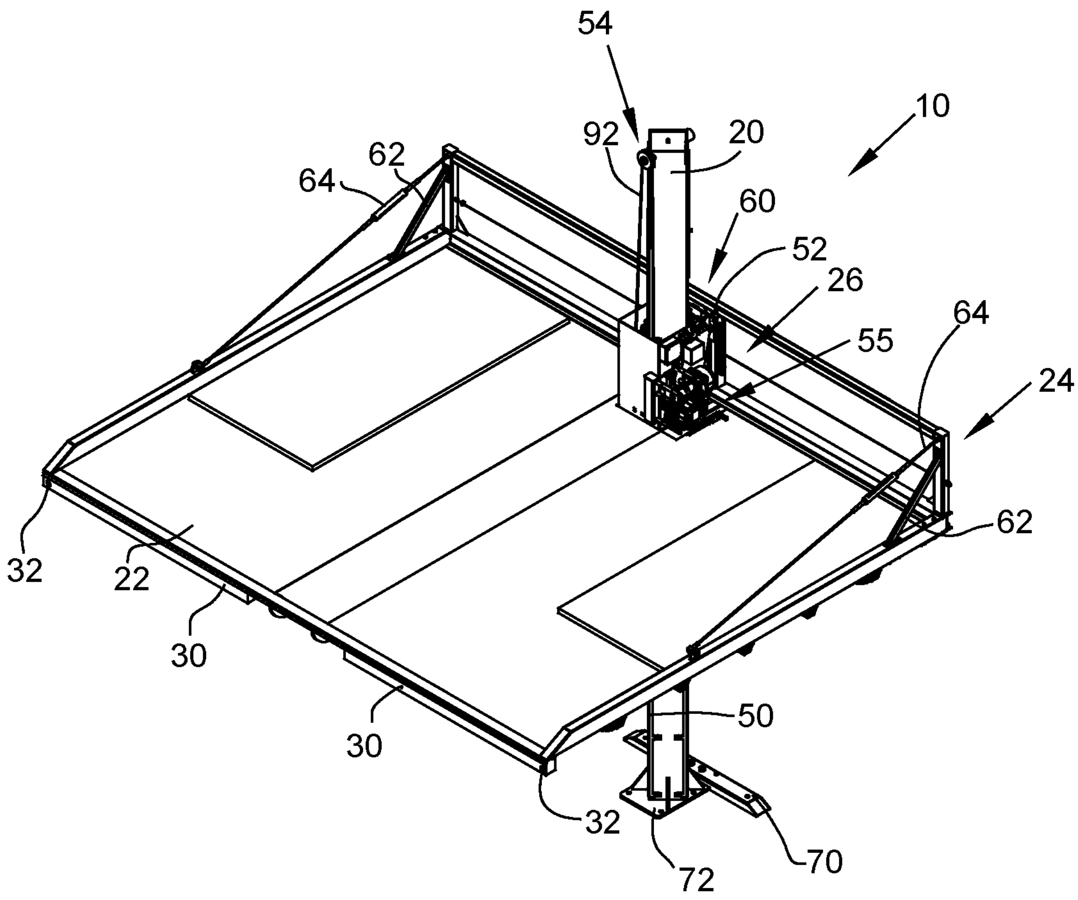
FIG. 1 is a perspective view of one embodiment of a lift and storage system in accordance with the invention in a partially raised configuration.

Corresponding reference characters indicate corresponding parts throughout the several views. Although the drawings represent embodiments of the present invention, the drawings are not necessarily to scale, and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

FIG. 1 shows one embodiment of a lift and storage system, generally indicated as 10 in a partially raised position. Lift and storage system 10 includes a single support post 20, a platform 22, a platform support generally indicated as 24, and a lifting mechanism generally indicted as 26. This embodiment also includes two adjustable (drop down) support legs 30 (on the front of the platform) folded up next to the platform in FIG. 1 but are configured to be able to pivot down on hinges 32 and provide additional support for items stored on platform 20.

Figure 2:
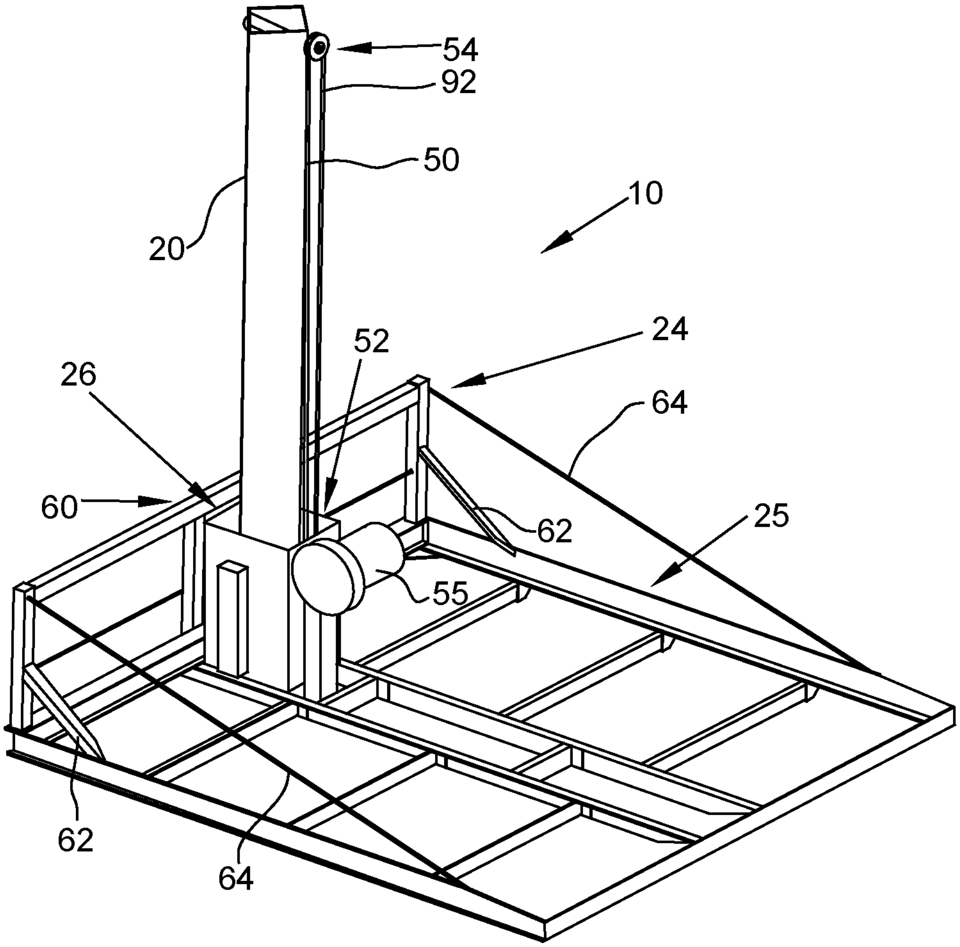
FIG. 2 is a perspective view of the lift and storage system of FIG. 1 shown in a lowered position with the platform removed and showing the frame for a platform support.
Figure 3:
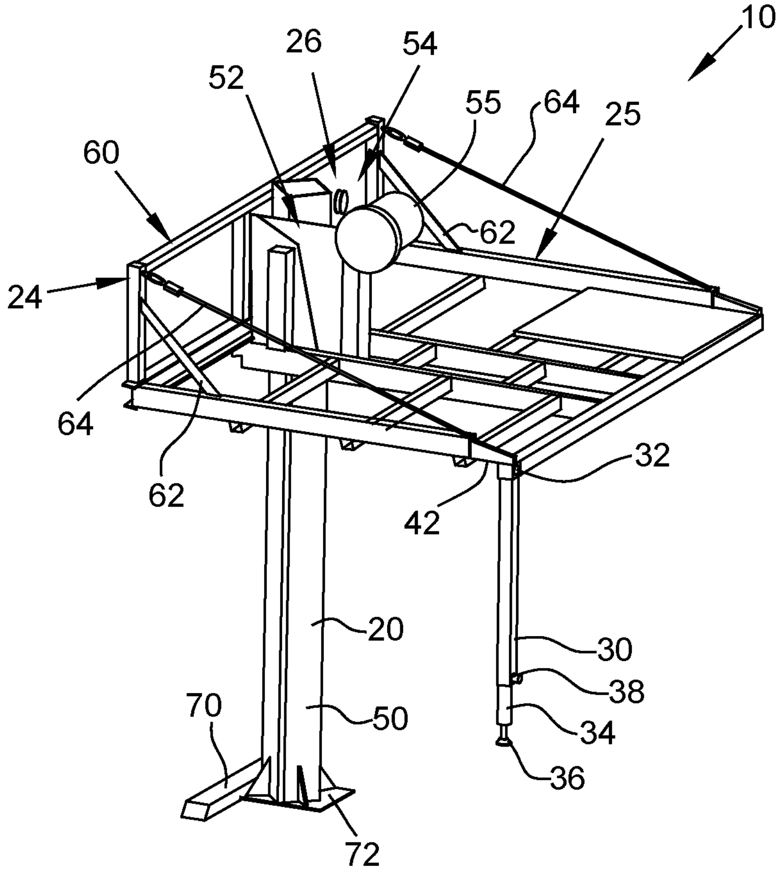
FIG. 3 is a perspective view of the lift and storage system of FIG. 1 shown in a raised position with the platform removed and showing the frame for the platform support.

FIGS. 2 and 3 show the lift and storage system 10 in a lowered position and raised position, respectively. Platform 22 has been removed in FIGS. 2 and 3 to show further details of one embodiment of platform support 24, including a platform support frame, generally indicted as 25. In FIG. 3, one of the support legs 30 is shown pivoted down to a vertical orientation where it can be used as described above to help support items on the platform. As can be seen, support leg 30, includes a telescoping member 34 and an adjustable foot pad 36. The telescoping support leg can be secured at the desired length using know means such as spring-loaded pins 38 that can be used to secure the telescoping leg through apertures in the support leg at the desired height.

Figure 4:
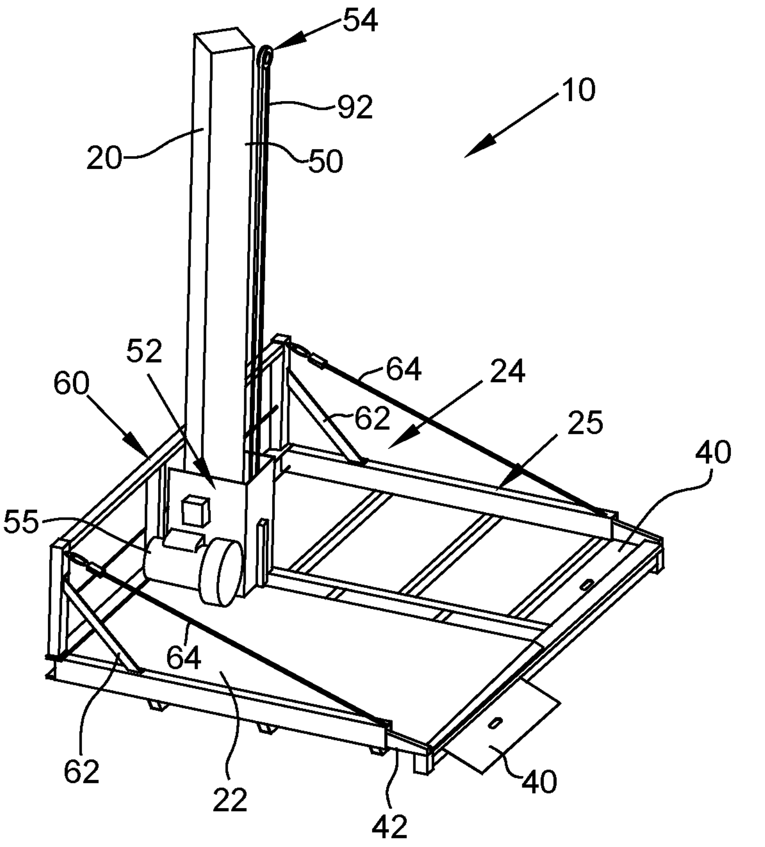
FIG. 4 is another perspective view of the lift and storage system of FIG. 1 shown in a lowered position with part of the platform removed and showing the frame for a platform support.
Figure 4A:
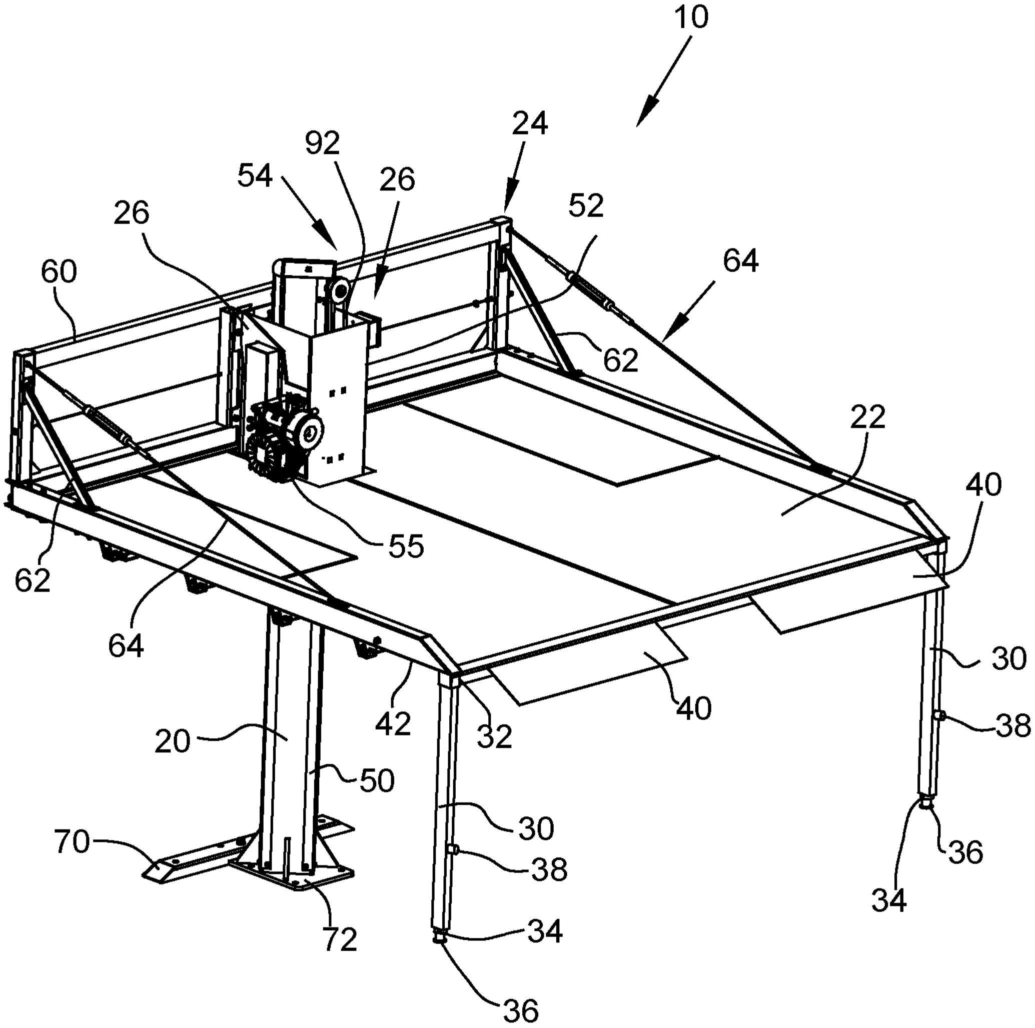
FIG. 4A is another perspective view of the lift and storage system of FIG. 1 shown in a raised position with both support legs and vehicle ramps extended.

Now referring to FIGS. 4 and 4A, two (storable) approach ramps 40 can be used when needed, and then stored back under the platform flooring when not needed. These ramps 40 allow for a wheeled vehicle or loading cart to easily move on and off the lowered platform. In one embodiment, the adjustable platform 22 is sized to be 8 feet wide and 6 feet extended. The ramps 40 can be attached and moved into a use and storage position using pivoting or hinged mechanisms or alternately can be configured to pull out from openings in the front of the lift and storage system frame. The ramps may ride on rollers along a track. The rollers can be attached to the track or ramps. The ramps may also be removed from a stored area and attached manually. The platform 22 is configured so that the sides of platform support frame 25 can be telescoped inward with members as indicated at 42, which shortens the platform's outward extension from the original configuration of 8 feet to 6 feet.

In one embodiment, support post 20 is configured as a square tubed vertical column and lift and storage system 10 is manufactured so that one corner 50 of the four corners (angles) is facing forward toward the middle of the platform 22. Lifting mechanism 26 includes a wraparound carriage, generally indicated as 52, and a wire cable pulley system, generally indicated as 54 are shown next to the column (on the platform). The wire cable pulley system 54 is controlled/operated by a servo motor 55. Lifting mechanism 26 also includes a cable drum 56, a top pulley 58, and a cable 92. Cable 92 is threaded around top pulley 58 and wound around cable drum 56. When servo motor 55 is activated, cable drum 56 turns and platform 22 is raised by turning cable drum 56 in a direction that winds more of cable 92 around drum 56. Alternately, to lower platform 22, the servo motor is activated to turn cable drum 56 in the opposite direction unwinding cable 92 from around the drum 56.

A back brace, generally indicated as 60, has two stress support systems that attach to the platform support frame 25. The back brace 60 will require a plurality of different adjustable length support rods 64 and braces 62 to accommodate the different sized platforms 22.

The rod support system 64 attached to the front of the platform frame assembly 25 is adjustable so that the loaded platform 22 remains level (parallel to the floor) when either raised or lowered and then in final stored position.

A column base extension 70 (See FIGS. 1 and 3), which can be lagged into a concrete floor, provides additional support for the column base 72 of support post 20 to help ensure that the vertical column support post 20 remains rigid when the loaded platform 22 is either raised or lowered.

Figure 11:
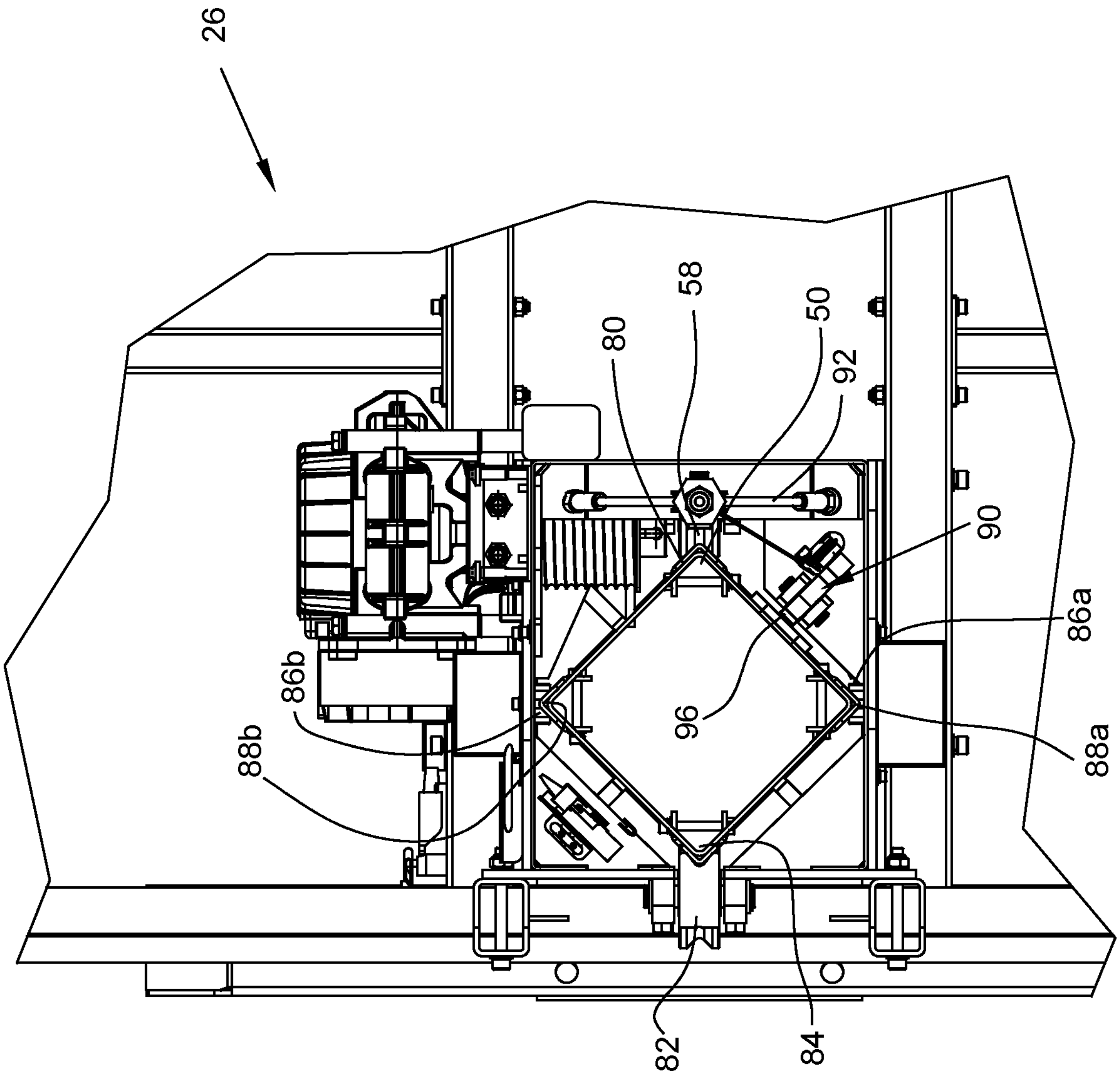
FIG. 11 is a top view of the lift and storage system of FIG. 1 showing an enlarged area of the support post and lift mechanism.

FIG. 5-13 show additional details of the support post 20 and lifting mechanism 26. In particular, the lifting mechanism 26 includes a pair rollers 80 riding on front corner 50 of support post 20 and a pair of rollers 82 riding along a rear corner 84 of support post 20. Referring to FIG. 11, lift system 26 may also include side rollers 86*a, b* riding alongside corners 88*a, b*, respectively. The rollers allow smooth travel of the lifting mechanism/carriage 26 as it moves up and down the column/support post 20. A spring load is applied to these rollers ensure that all rollers maintain contact with the column 20 as the platform 22 and carriage 26 are raised or lowered. This roller system also helps to equally transfer the stress force of the extended platform 22 to all sides of the vertical column 20. Plastic or synthetic material slide (glide) blocks can be used in place of the spring-loaded roller system. Spring loaded rollers are used in the embodiment shown though, as the roller system requires less force to move vertically than the synthetic slide blocks. Synthetic slide blocks inside of wrap around carriages are used in four post above ground vehicle lift systems.

In the embodiment shown, lift and storage system 10 also includes an automatic locking system inside the wrap around carriage 26. This spring-loaded carriage lock system engages automatically as the platform is rested on the top lock ladder position shown in FIG. 10.

Figure 5:
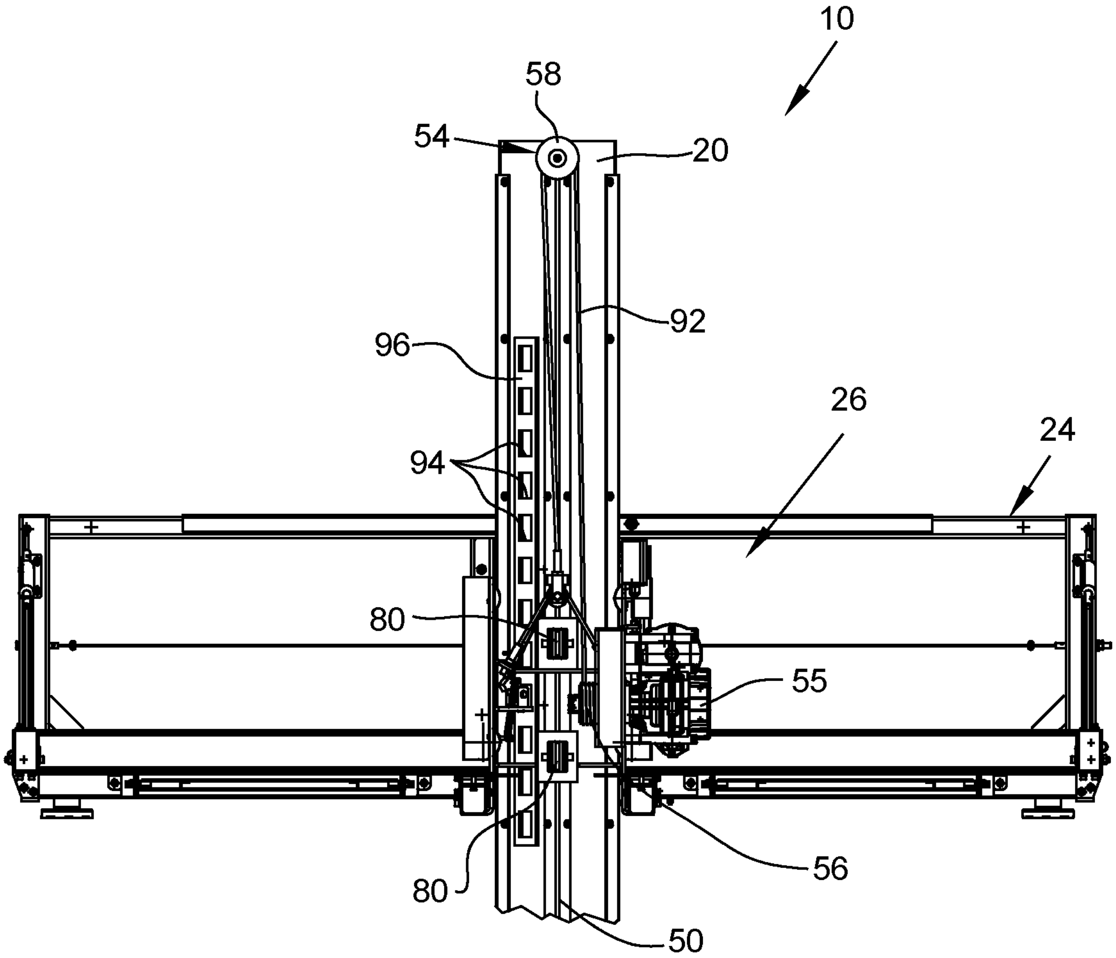
FIG. 5 is a front view of the lift and storage system of FIG. 1 with the front of the platform, platform support, and wrap around carriage removed for clarity.
Figure 6:
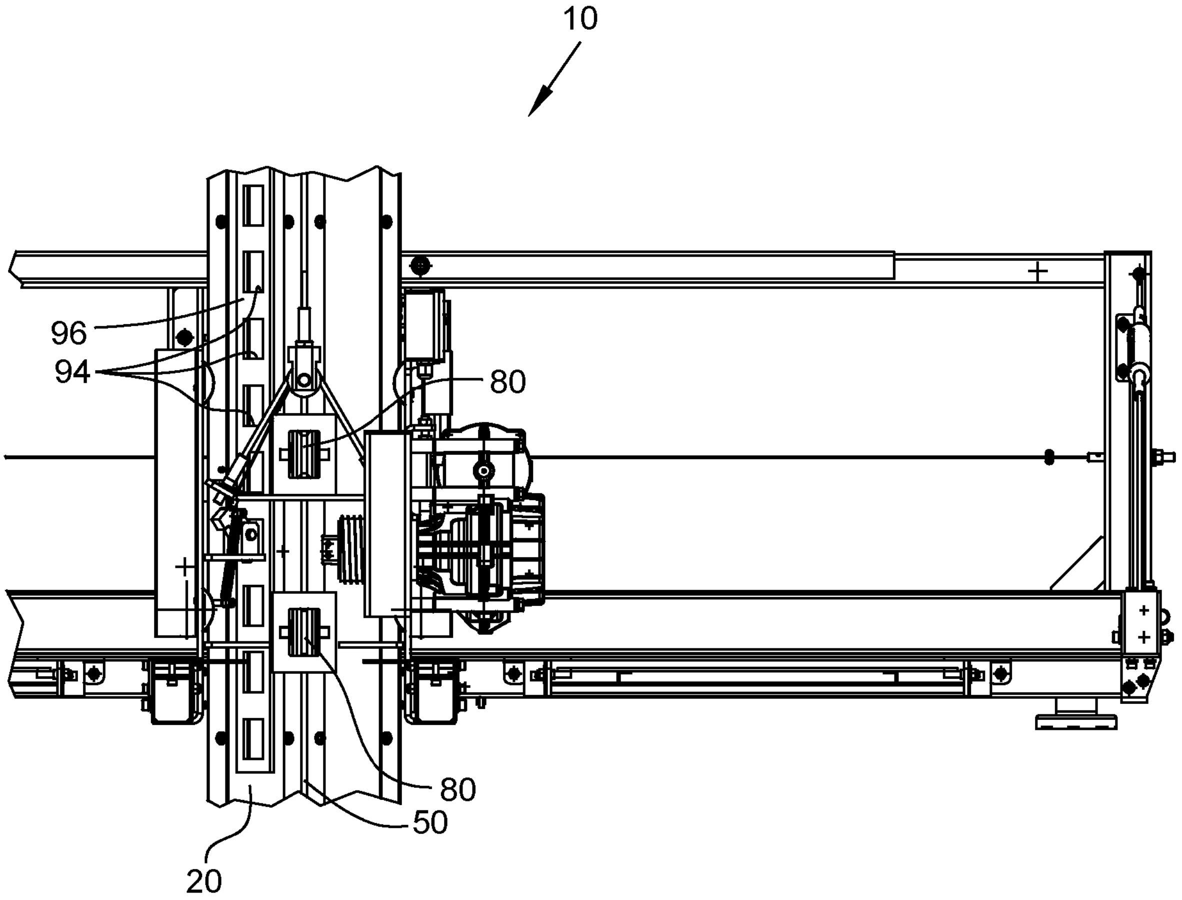
FIG. 6 is enlarged closer front view of the lift and storage system of FIG. 1 with the front of the platform, platform support, and wrap around carriage removed for clarity to show details of the lift mechanism.
Figure 7:
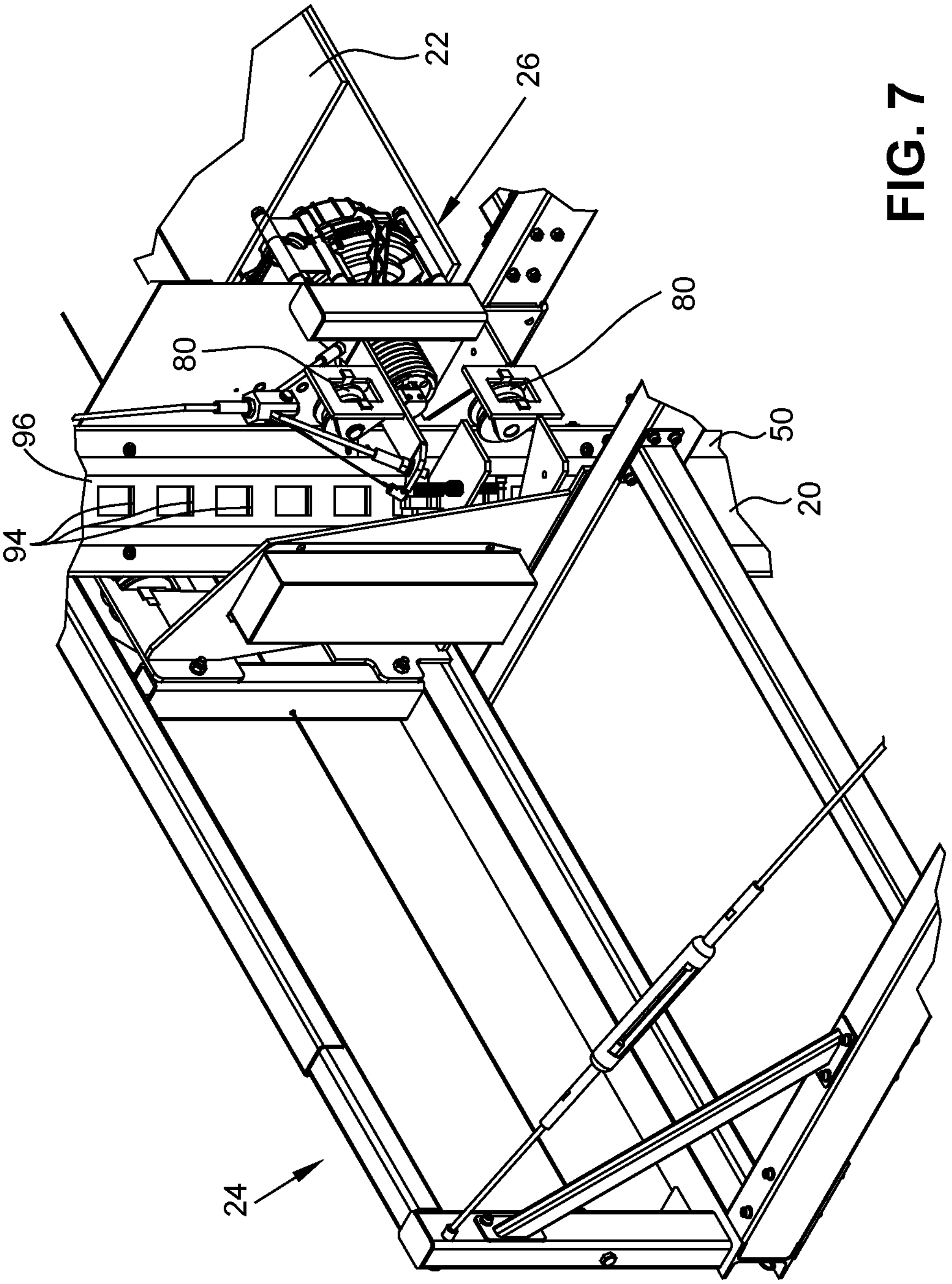
FIG. 7 is a top-front perspective view of the lift and storage system of FIG. 1 with the front of the platform, platform support, and wrap around carriage removed for clarity.
Figure 8:
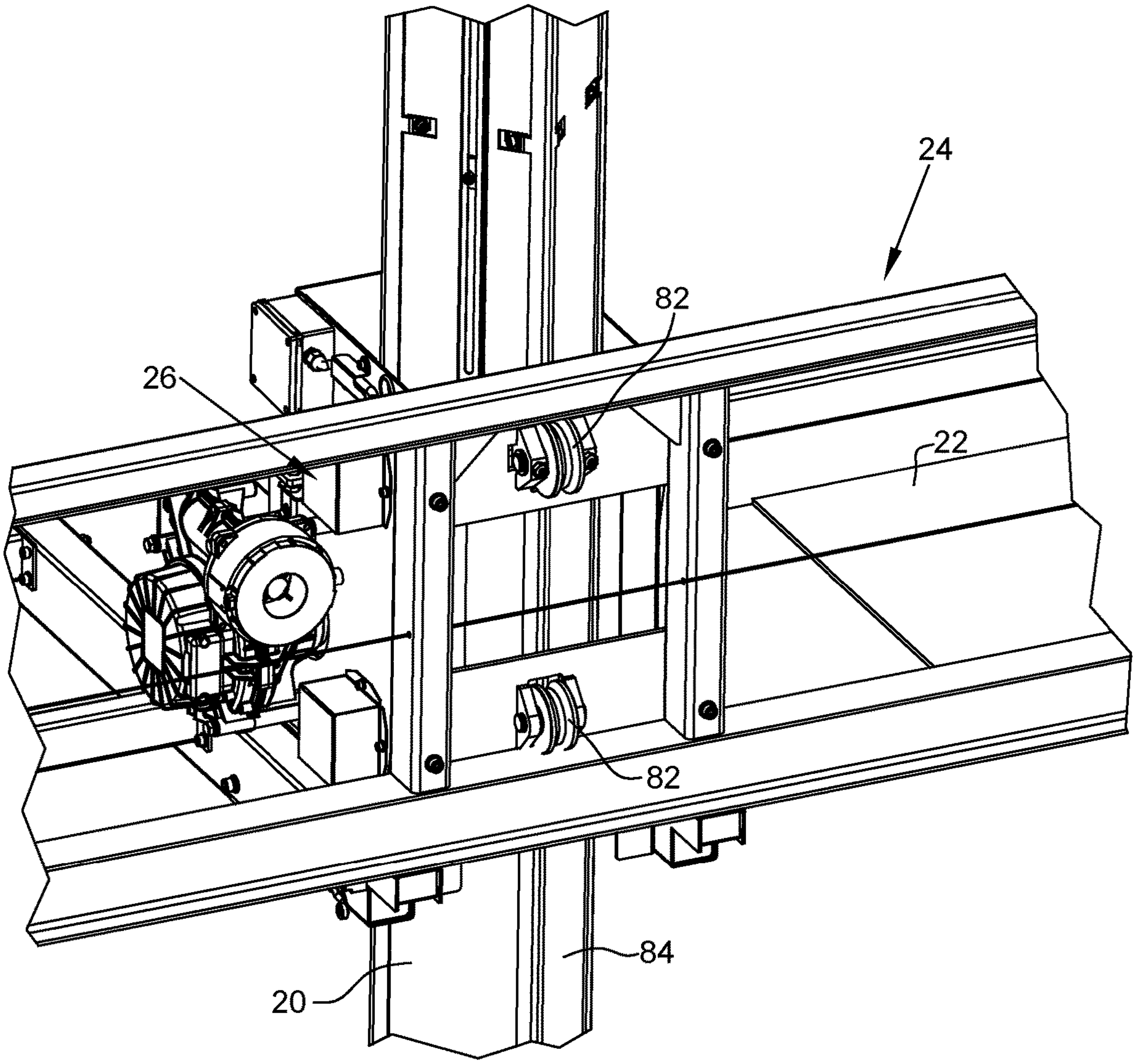
FIG. 8 is an upper rear perspective view of the lift and storage system of FIG. 1 with the front of the platform, platform support, and wrap around carriage removed for clarity showing rear details of the lift mechanism.
Figure 9:
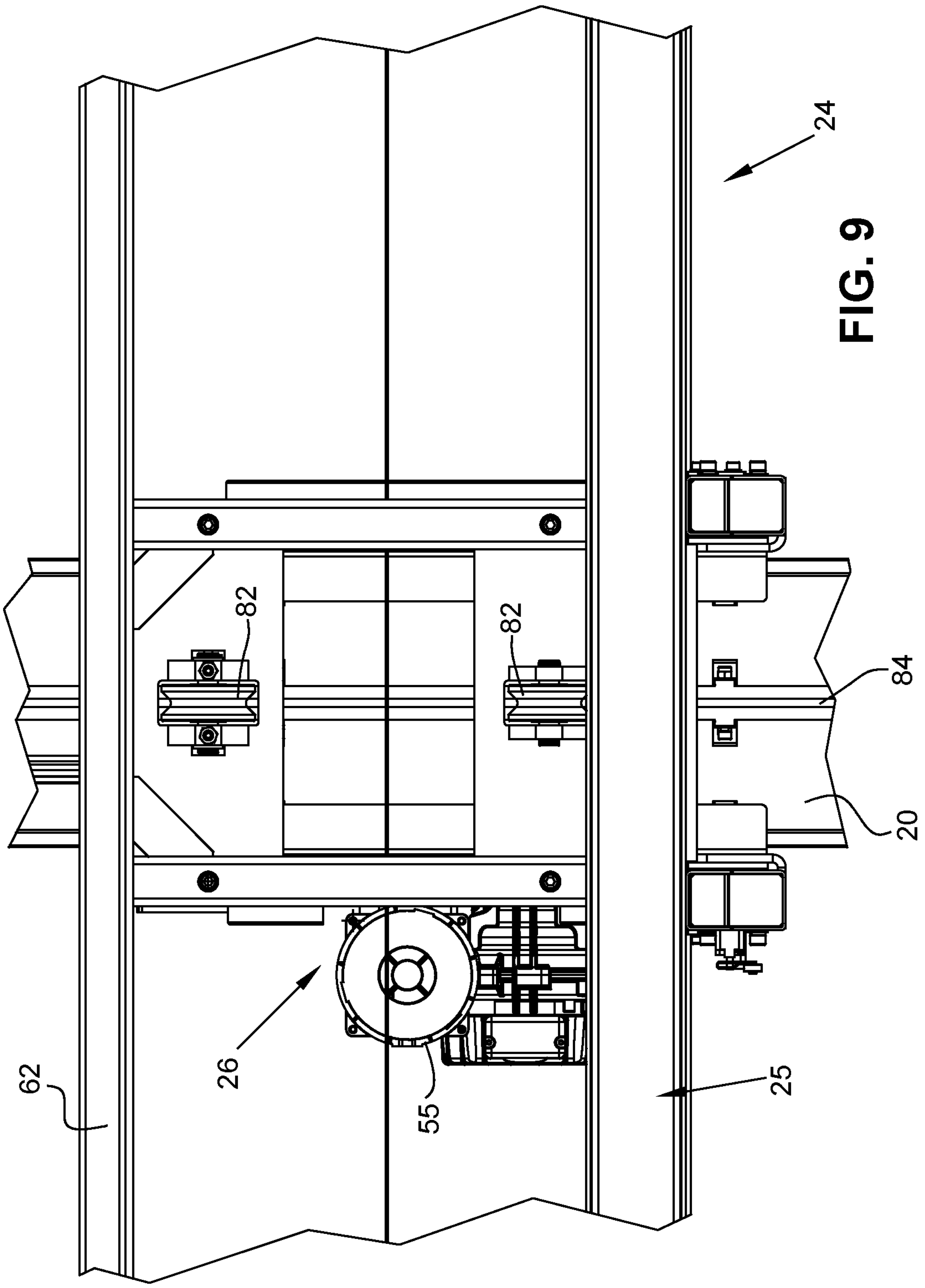
FIG. 9 is a rear view of the lift and storage system of FIG. 1 showing an enlarged area around the lift mechanism.
Figure 10:
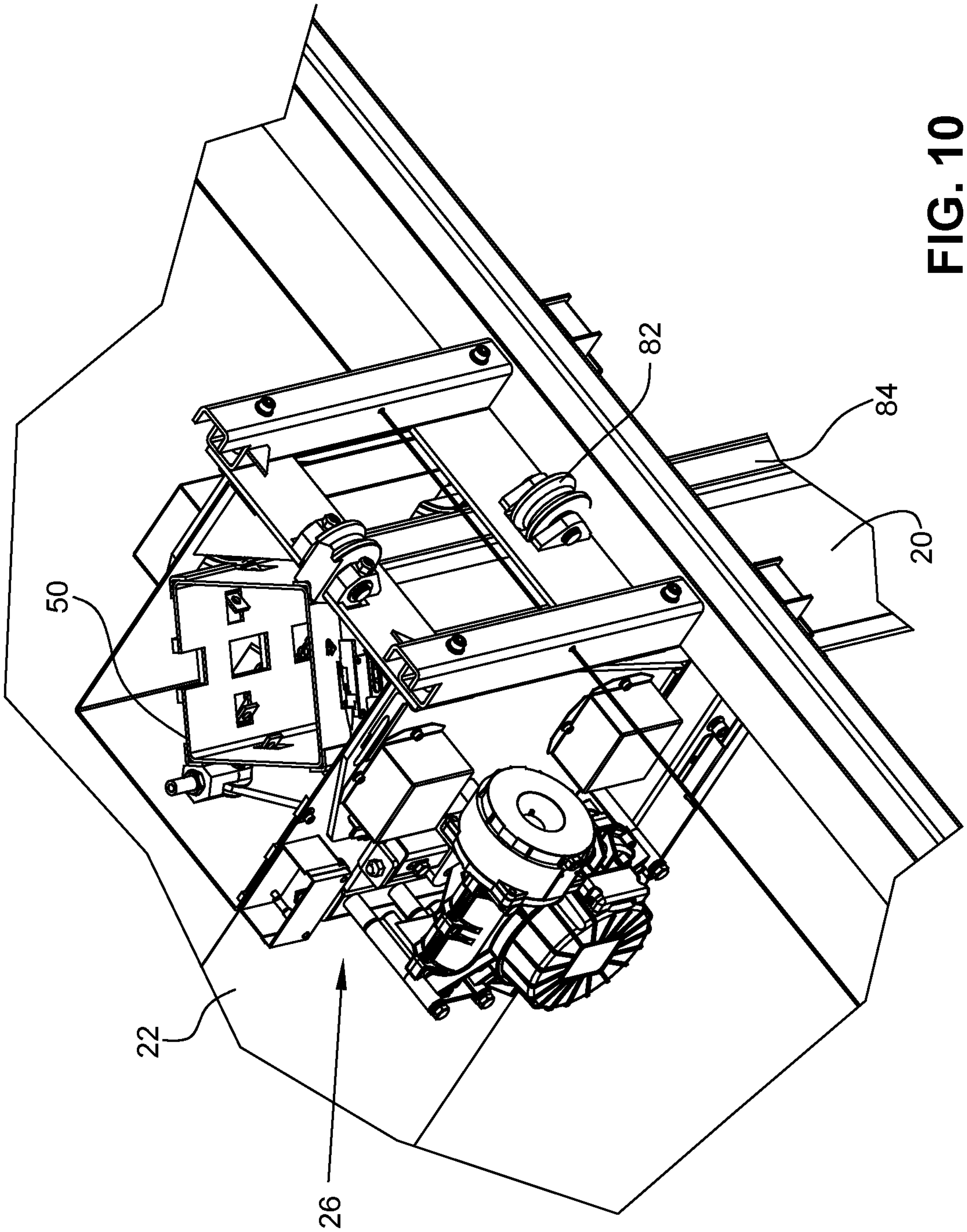
FIG. 10 is a top rear perspective view of the lift and storage system of FIG. 1 showing top rear details of the support post and lift mechanism.

Now referring to FIGS. 14-18, lift and storage system 10 also includes a cable safety system, generally indicated as 90. In case of a cable 92 failure the platform/carriage will descend only as far as the next lock 94 on the lock ladder 96 mounted to the column 20. Cable safety system 90 includes a safety wire 98 and a lock engagement, generally indicated as 100. The lock engagement includes a spring 101, that pulls a lock member 104 into the closest/next lock 94 on lock ladder 96 if cable 92 ruptures, thereby preventing the platform 22 from falling if cable 92 breaks. FIGS. 5 and 6 show the angled column 20 with the lock ladder 96 system mounted on the side.

Figure 12:
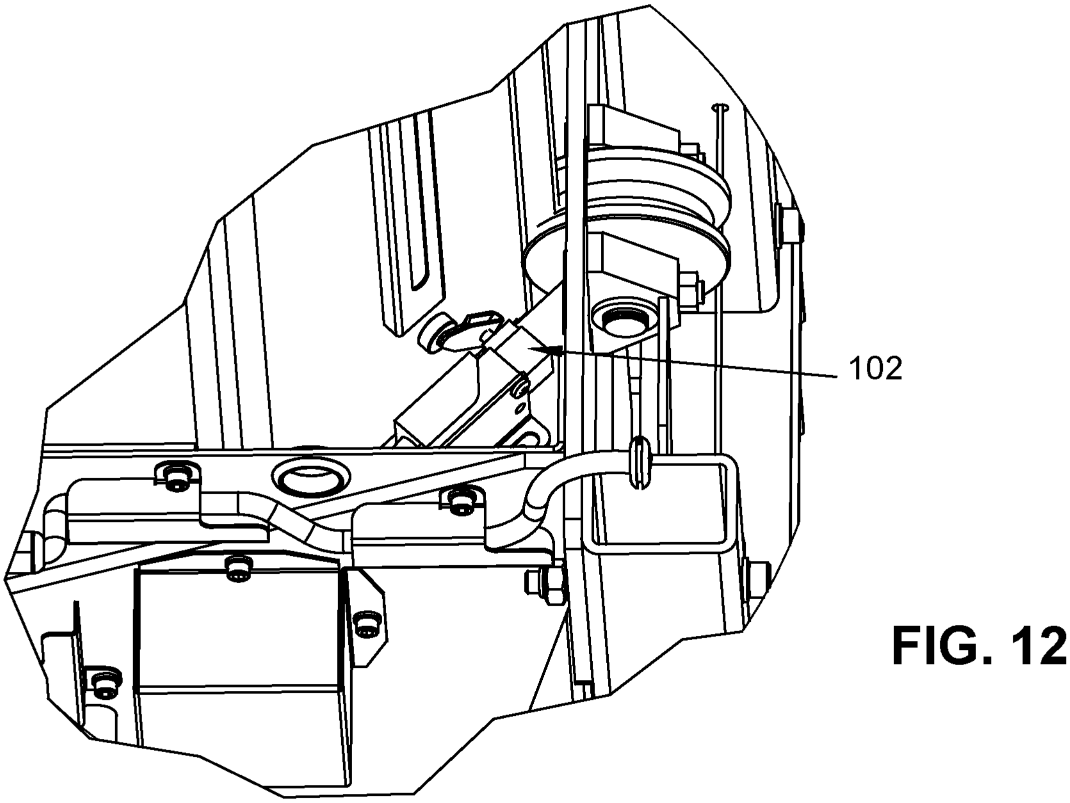
FIG. 12 is a top perspective view of the lift and storage system of FIG. 1 showing the top auto stop for the lift mechanism.
Figure 13:
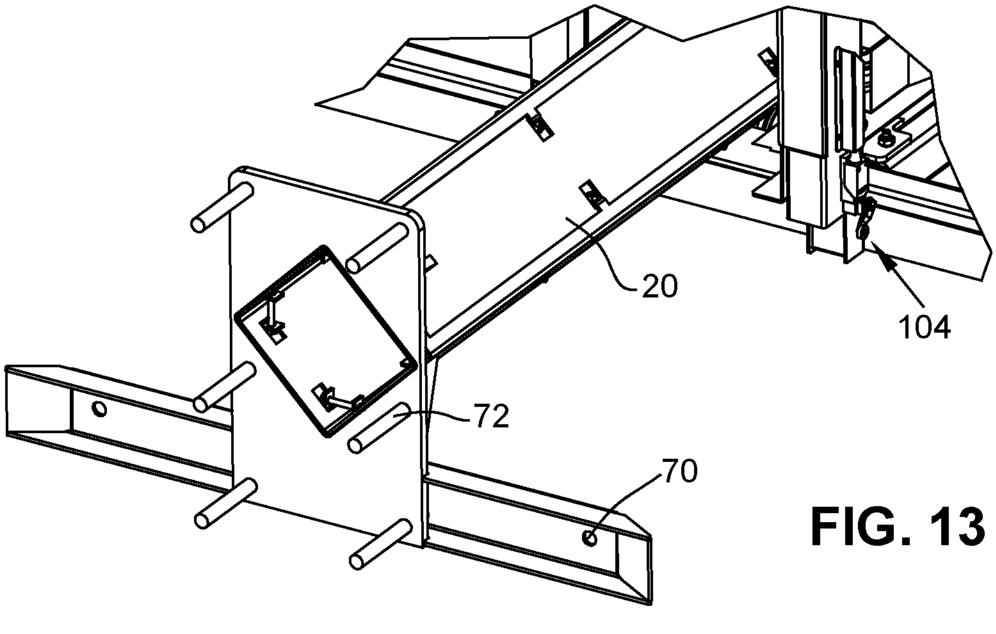
FIG. 13 is a bottom perspective view of the lift and storage system of FIG. 1 showing the bottom auto stop for the lift mechanism.
Figure 14:
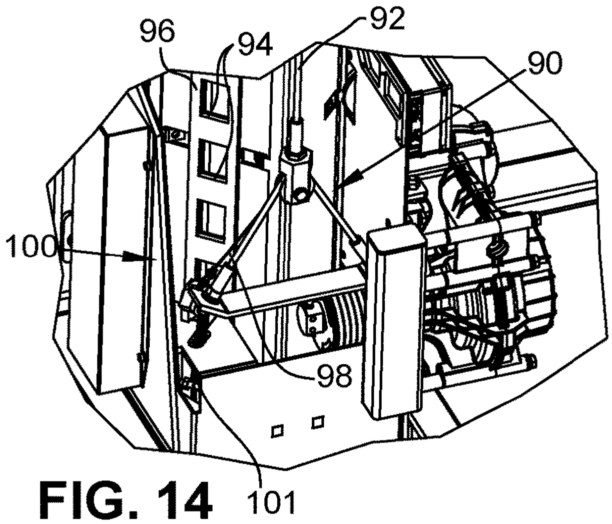
FIG. 14 is a perspective view of a cable safety device on the lift and storage system of FIG. 1.
Figure 15:
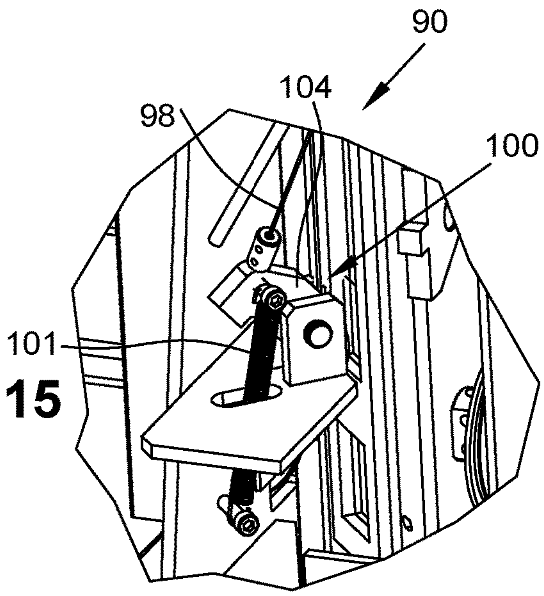
FIG. 15 is an enlarged perspective view of a cable connection block of the cable safety device in a normal status on the lift and storage system of FIG. 1.
Figure 16:
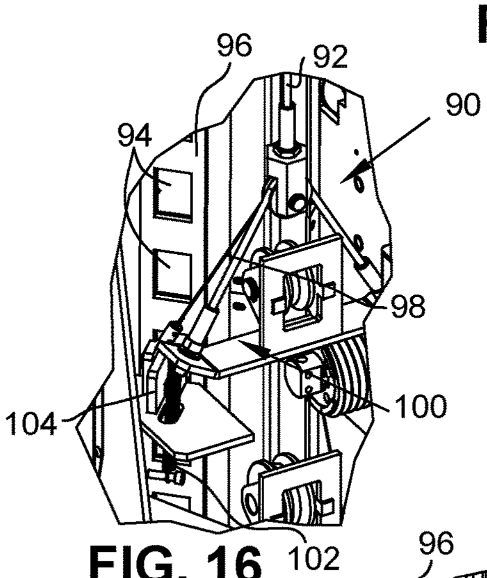
FIG. 16 is a perspective view of the cable safety device on the lift and storage system of FIG. 1 showing a cable failure.
Figure 17:
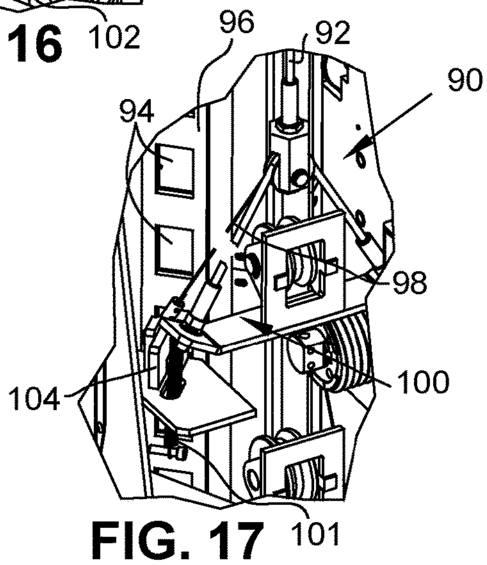
FIG. 17 is an enlarged perspective view of the cable safety device on the lift and storage system of FIG. 1 showing a cable failure.
Figure 18:
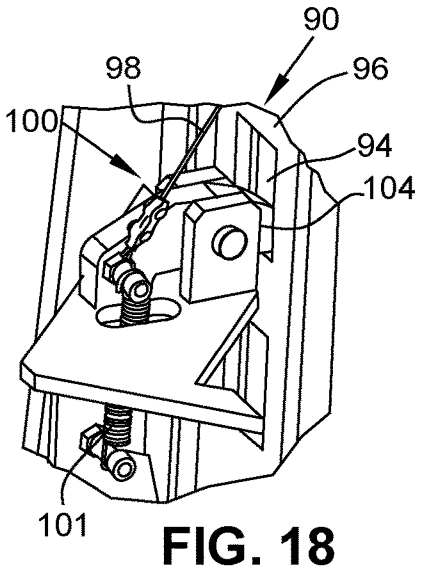
FIG. 18 is an enlarged perspective view of the cable connection block of the cable safety device in a locked engagement after a cable failure on the lift and storage system of FIG. 1.

FIGS. 12 and 13 shows the moveable auto stop feature (located on the side of the column), including a top auto stop 102, which controls the maximum height that the platform 22 can be raised. This important feature is needed to ensure that a "loaded" platform raised height is automatically controlled so that items stored on the moving platform do not contact the ceiling causing damage to the items or the ceiling. The operator/user will determine the maximum height the platform can be safely raised with the loaded platform. The user will then install the auto stop device 102 in the correct position so that the electric power to the servo motor will automatically become disconnected when the platform reaches that installation point, even if the operator continues to engage the remote.

There is also another (second one) electrical auto stop 104 that automatically stops the cable drum 56 turning when the platform reaches the bottom. This is needed to make sure that the cable 92 on the drum 56 does not unspool and keeps tension on the cable 92.

Figure 19:
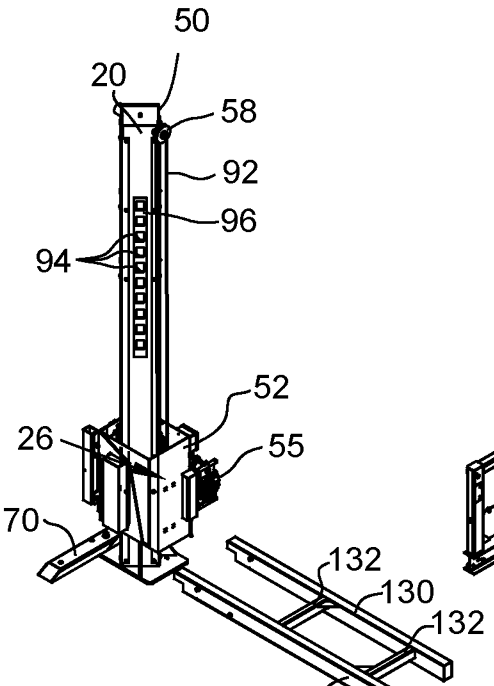
FIG. 19 is a perspective view of the support post and lifting mechanism of the lift and storage system of FIG. 1 with a partial platform support frame shown.
Figure 20:
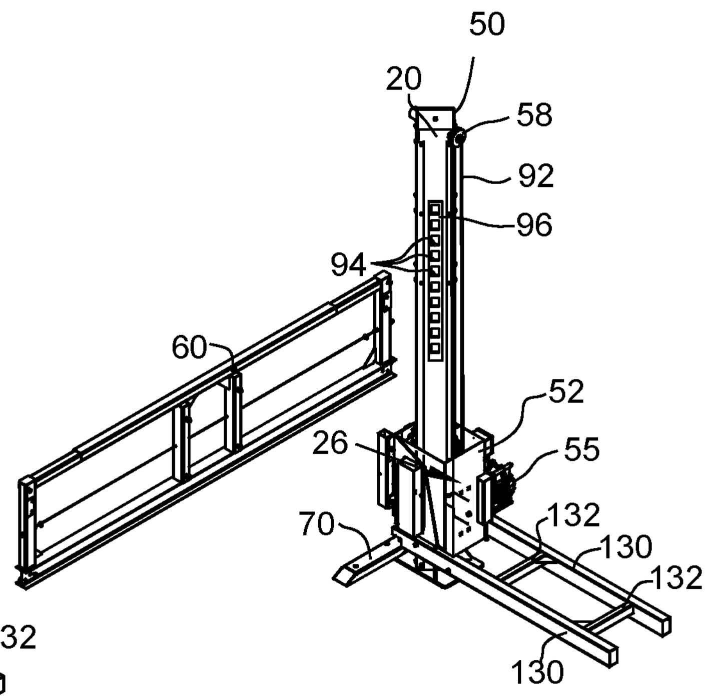
FIG. 20 is a side perspective view of the support post and lifting mechanism of the lift and storage system of FIG. 1 with the partial platform support frame including a back frame shown.
Figure 21:
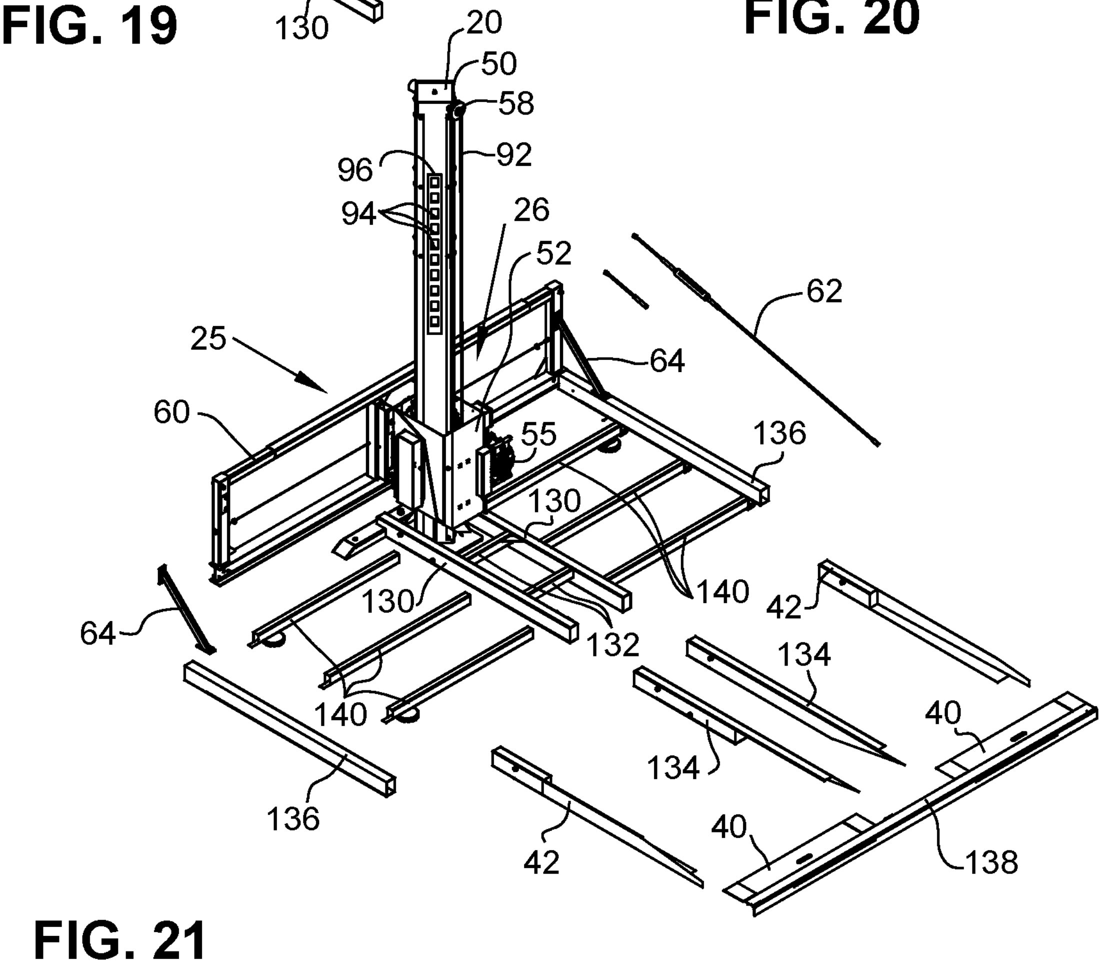
FIG. 21 is a perspective view of the support post and lifting mechanism of the lift and storage system of FIG. 1 with the platform support frame shown in an exploded view.

Now referring to FIGS. 19-21, the assembly of platform support frame 25 is shown. The middle portion of platform support frame 25 includes two front to back facing members 130, which are attached to wrap around carriage 52 toward the back end of the platform support frame 25. The middle portion also includes cross members 132 in the embodiment show, which may be attached to members 130 using welding techniques or the use of know fasteners. In FIG. 20, back brace 60 is shown being added to the platform support frame. The remaining members of the embodiment shown of platform support frame 25 are shown in FIG. 21. This includes two middle telescoping frame members 134, which are telescopingly received middle front to back members 130 and side frame members 136, which telescopingly receive members 42. Support platform frame 25 also includes a front member 138 which is attached to telescoping members 42 and 134 using fasteners or other means, such as permanent attachment by welding. Movable and storable approach ramps 40 are hingedly connected to front member 138. Platform support frame 25 also includes cross frame members 140, which are attached to and extend between side frame members 136 and middle front to back frame members 130. In one embodiment, the adjustable platform design allows telescoping members 42 and 134 to be adjusted (in and out) to create an extended platform size that is less than 8 feet.

Figure 22:
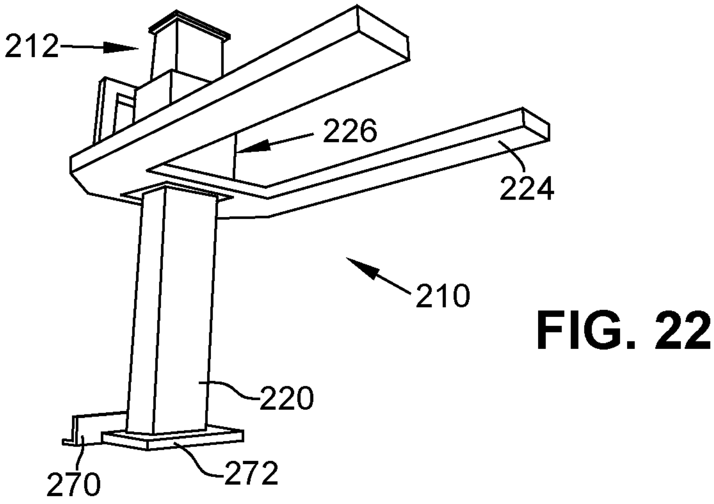
FIG. 22 is a bottom perspective view of an alternate embodiment lift and storage system configured to be mounted in a corner of a building.
Figure 23:
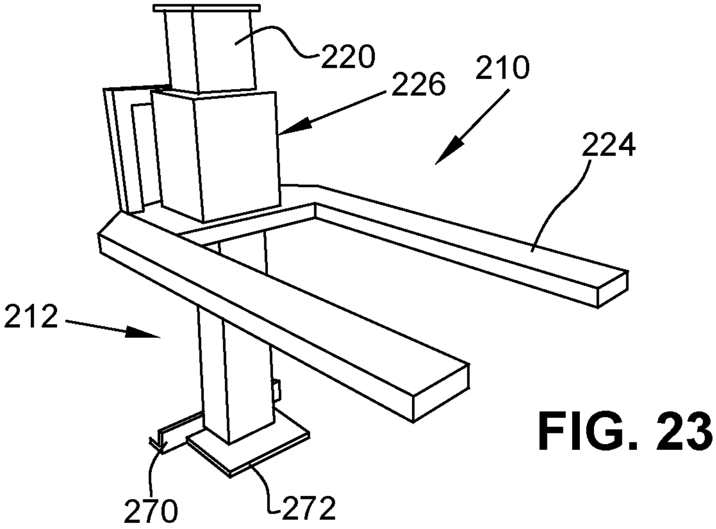
FIG. 23 is a top perspective view of the lift and storage system of FIG. 14.
Figure 24:
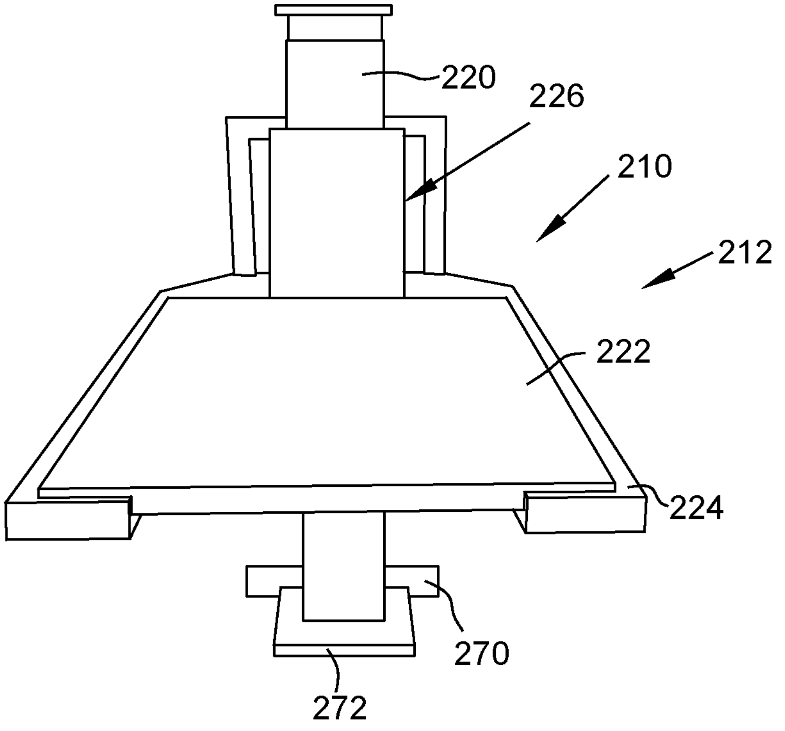
FIG. 24 is a top perspective view of the storage and lift system of FIG. 14, with a platform mounted to the platform support.

Now referring to FIGS. 22-24, an alternate embodiment lift and storage system, generally indicated as 210, is shown. Lift and storage system 210 is particularly suited for, but not limited to, being installed in a corner of a garage 212 or other building as is shown. Lift and storage system 210 includes a support post 220, a platform 222 (see FIG. 24), a platform support 224, and a lifting mechanism generally indicated as 226. Support column or post 220 uses a column base extension 270 for additional securing and includes and is anchored with a base 272.

Figure 25:
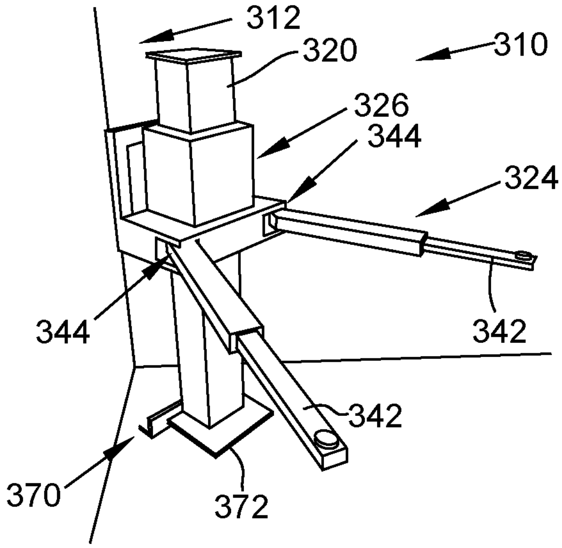
FIG. 25 is a top perspective view of yet another alternate embodiment lift and storage system configured to be mounted in a corner of a building including pivoting platform support members.
Figure 26:
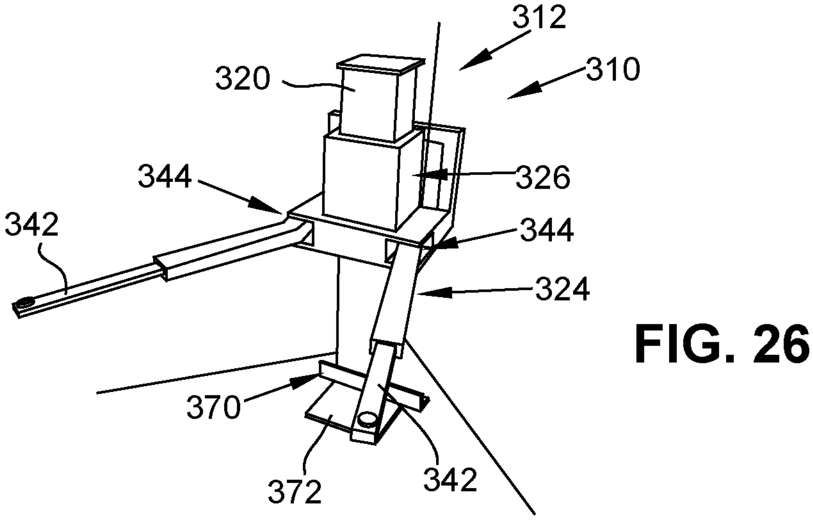
FIG. 26 is another top perspective view of the lift and storage system of FIG. 17.

Now referring to FIGS. 25 and 26, an yet another alternate embodiment lift and storage system, generally indicated as 310, is shown. Lift and storage system 310 is also particularly suited for, but not limited to, being installed in a corner of a garage 312 or other building as is shown. Lift and storage system 310 includes a support post 320, a platform support 324, and a lifting mechanism generally indicated as 326. A platform is not shown on the platform support 324, but of course is designed to be used to hold a platform. Platform support 324 includes telescoping members 342, which can be used to extend or shorten the length of the platform support. In addition, platform support 342 includes pivoting connections 344 so that the support arms can be swung out wider or mor narrowed depending upon the configuration of platform preferred. Support column or post 320 uses a column base extension 370 for additional securing and includes and is anchored with a base 372.

Figure 27:
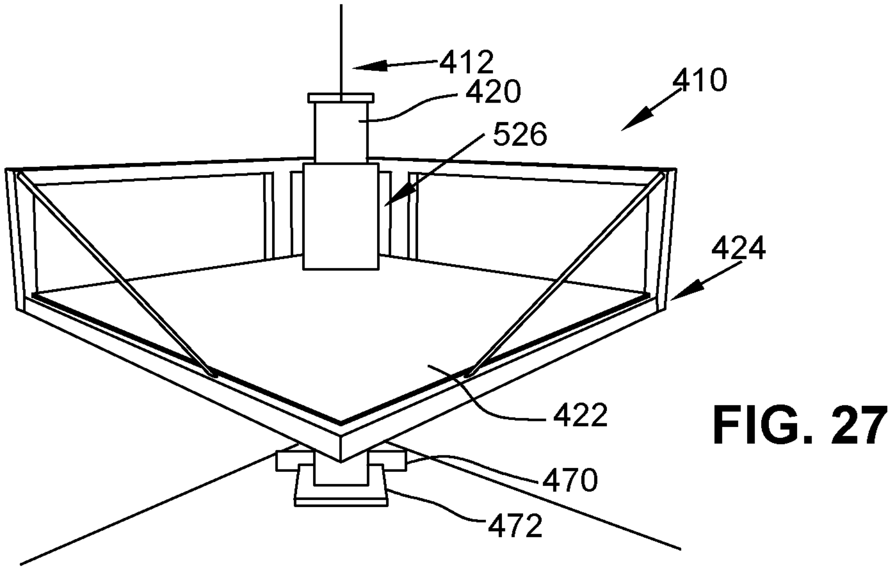
FIG. 27 is a top perspective view of yet another embodiment of a storage and lift system configured to be mounted in a corner of a building and including a platform mounted to a platform support.
Figure 28:
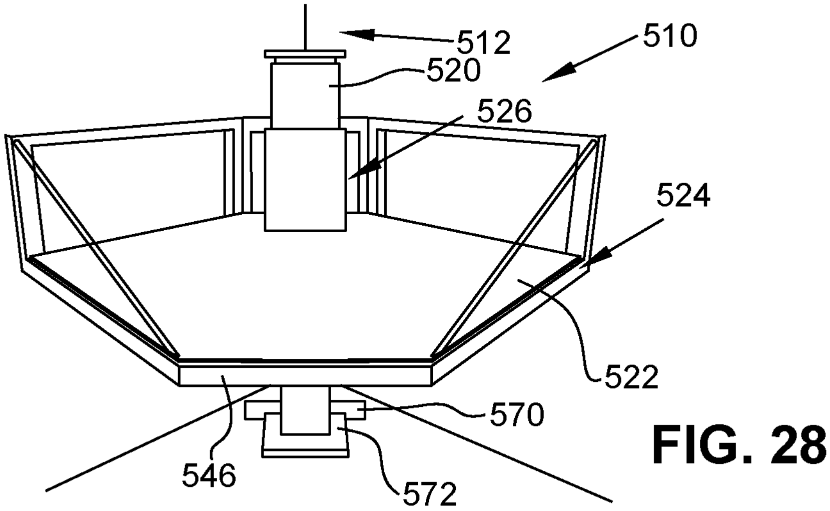
FIG. 28 is a top perspective view of still another embodiment of a storage and lift system configured to be mounted in a corner of a building and including a platform mounted to a platform support.

Now referring to FIGS. 27-28, two more alternate embodiment lift and storage systems, generally indicated as 410 and 510, respectively, are shown. Lift and storage systems 410 and 510 are particularly suited for, but not limited to, being installed in a corner of a garage 412 or 512 or other building as is shown. Lift and storage systems 410 and 510 include support posts 420, 520; platforms 422 and 522, platform supports 424, 524; and lifting mechanisms generally indicated as 426,526, all respectively. Support column or posts 420 and 520 use column base extensions 470 and 570 for additional securing and include and are anchored with bases 472 and 572, respectively. In the embodiments shown, the only difference between lift and storage systems 410 and 510, is that systems 510 have a front corner 546 squared off platform 522 and platform support 524, so that it does not stick out as far. Whereas the platform 422 and platform support 424 of lift and storage system 410 is square or rectangular.

Figure 29:
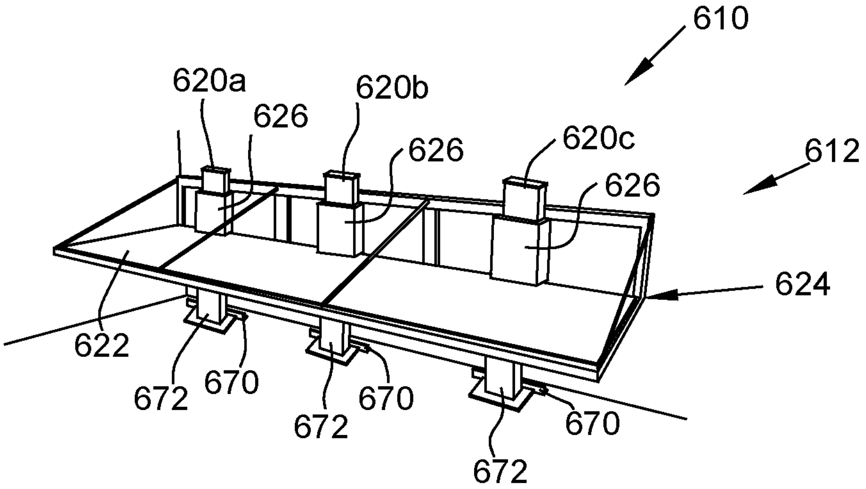
FIG. 29 is a top perspective view of yet another embodiment of a storage and lift system in a mezzanine or ganged configuration with several support posts holding an extended platform.
Figure 30:
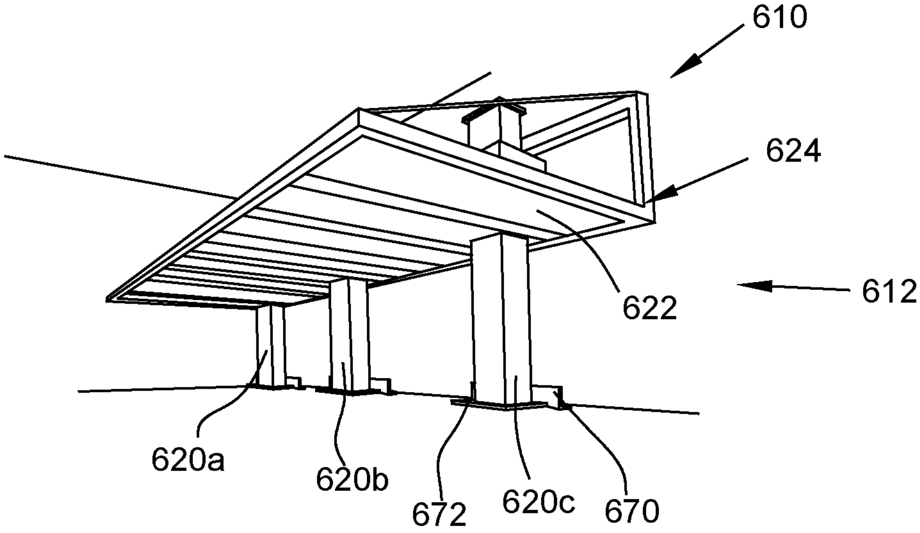
FIG. 30 is a bottom perspective view of the storage and lift system of FIG. 21.

Now referring to FIGS. 29-30, an alternate embodiment lift and storage system, generally indicated as 610, is shown. Lift and storage system 610 is a mezzanine or ganged system and is shown installed in a garage 212 or other building. In the embodiment shown, lift and storage system 610 includes three ganged support posts 620*a*, 620*b*, or 620*c*, a platform 622, a platform support 624, and a lifting mechanism generally indicated as 226 mounted on each support post. Support column or posts 620*a*, 620*b*, and 620*c* each use a column base extension 670 for additional securing and includes and is anchored with a base 272. Lifting mechanisms 626 are designed to be operated with a single control so that all three lifting mechanisms, along with platform 622 and platform support 624 raise or lower together. As should be appreciated lift and storage system 610 can lift and store more weight and bulk than a single post lift and storage system.

While the invention has been taught with specific reference to these embodiments, one skilled in the art will recognize that changes can be made in form and detail without departing from the spirit and scope of the invention. For example, although the application shows a servo motor operating a cable drum to raise and lower the lift and storage system, it should be appreciated that the other types of know lifting mechanisms can be substituted for the embodiments shown. This application is intended to cover any variations, uses, or adaptations of the invention using its general principles. Further, this application is intended to cover such departures from the present disclosure as has come within the known or customary practice in the art to which the invention pertains and which fall within the limits of the appended claims or equivalents thereof.

The invention claimed is:

1. A lift and storage system comprising:

a support post having a hollow generally rectangular cross section and a base, the base configured to be mounted to a floor of a building wherein a front corner of said rectangular cross section is facing forward presenting the post in a diamond configuration;

a platform support supported by said support post;

a platform mounted on said platform support; and a lifting mechanism supported on said support post, said platform support being movable by said lifting mechanism between a raised and lowered position.

2. The lift and storage system of claim 1, further including a column base extension, configure to be mounted to the floor of the building to provide additional securing support for said support post.

3. The lift and storage system of claim 1, wherein the lifting mechanism includes a servo motor and a cable drum, the cable drum being turnable in opposite directions to either raise or lower said support platform.

4. The lift and storage system of claim 3, wherein the lifting mechanism further includes a top pulley attached at a top end of the support post and a cable received in and moving along a groove of the pulley as the platform support is raised and lowered, and said cable is wound around said cable drum when said support platform is being raised and unwound from around said cable drum when said support platform is being lowered.

5. The lift and storage system of claim 4, further including a wraparound carriage connecting the lifting mechanism to the platform support.

6. The lift and storage system of claim 5, further including rollers that roll along said front corner and a rear corner of said support post as said support platform is raised and lowered along said support post.

7. The lift and storage system of claim 6, further including additional rollers rolling along side corners of said support post as said support platform is raised and lowered along said support post.

8. The lift and storage system of claim 7, wherein there are a pair of rollers rolling along each of the corners of said support post, and said rollers are spring loaded to maintain contact with said support post.

9. The lift and storage system of claim 7, further including adjustable top and bottom auto stops to limit upward and downward movement of the support platform.

10. The lift and storage system of claim 9, further including a cable safety device, to prevent said platform support from falling if said cable breaks.

11. The lift and storage system of claim 10, wherein said cable support system includes a lock ladder mounted on said support post having locking apertures therealong.

12. The lift and storage system of claim 11, wherein said cable safety device further includes a safety wire and a lock engagement, said safety wire moving said lock engagement into a locked position into one of said locking apertures should said cable break to prevent said support platform from falling.

13. The lift and storage system of claim 12, wherein said cable safety device further includes a biasing spring to bias said lock engagement into a locking aperture in the event of a cable break.

14. The lift and storage mechanism of claim 1, wherein said platform support includes telescoping members, so that a length of said platform support can be adjusted to allow for a larger or smaller storage area on said platform.

15. The lift and storage system of claim 1, wherein the system is configured to be mounted in a corner of a building.

16. The lift and storage system of claim 1, wherein there are a plurality of support posts and lifting mechanisms to lift a common support platform extending between said plurality of support posts.

17. The lift and storage system of claim 16, wherein the plurality of lifting mechanisms are synchronized to move simultaneously in the same direction to raise and lower the common support platform.

* * * * *